UNITED STATES PATENT OFFICE.

RAPHAEL JOSIA, OF FLORENCE, ITALY, ASSIGNOR TO WILLIAM REY AND C. DE VARIGNY, BOTH OF PARIS, FRANCE.

COMPOSITION FOR TREATING SULPHATES OF LIME FOR THE MANUFACTURE OF ARTIFICIAL MARBLE.

SPECIFICATION forming part of Letters Patent No. 265,507, dated October 3, 1882.

Application filed August 9, 1882. (No specimens.)

*To all whom it may concern:*

Be it known that I, RAPHAEL JOSIA, of Florence, Kingdom of Italy, have invented or discovered a new and useful Improvement in Compositions for Treating Sulphates of Lime for the Manufacture of Artificial Marble; and I do hereby declare the following to be a full, clear, concise, and exact description thereof.

In an application for Letters Patent of the United States filed March 2, 1882, I have described and made claim to an improved process of treating or preparing gypsum (calcic sulphate or sulphate of lime) in the making of articles of a material which I have termed "certaldite" without pulverization of the gypsum. In said application I described briefly certain of the compounds or compositions which I employ to produce certain effects and the manner of using them, but stated that separate applications would be made for patents for such compositions.

The present application relates to one of the compositions (a double or two-part one) so referred to, the two parts being designed for alternate use as two separate baths in the process herein described for making yellow certaldite.

In carrying out the process referred to a suitable piece of gypsum (calcic sulphate) is first formed into the desired shape, or approximately such, by the use of suitable well-known tools. The gypsum employed may be the ordinary native gypsum of commerce, though I prefer that which is comparatively pure or free from other matters of different composition. Such gypsum is usually obtained hydrated, or containing a certain percentage of water in its composition; and the second step in the operation has reference to depriving the gypsum under treatment of a considerable part or the whole of such water. This is done by subjecting it to the action of a gradually-increasing heat, varying by preference with the size and quality of the material, from 260° to 300° Fahrenheit, for about twelve hours, or until the desired partial or complete dehydration is obtained. The length of time, as well as the degree of heat required to effect this result, will vary somewhat with the size, character, and purity of the gypsum employed; but the temperature should not exceed 500° Fahrenheit, and both it and the time of exposure should be regulated and limited with reference to securing uniformity of treatment throughout the whole mass or body. This operation may be known to be complete when a fracture of a test block presents a uniform white color. Any suitable drying or baking apparatus may be employed for this purpose, many such being known in kindred branches of the arts; but it should be of such construction that the material under treatment shall not be brought into direct contact with the fire. When the desired dehydration has been effected the furnace is allowed to cool gradually, in order that the material under treatment may be cooled gradually; or the material may be removed, with due care to prevent breaking and exposure to moisture, and allowed to cool outside the furnace gradually until it is reduced in temperature sufficiently to permit handling with safety in its subsequent treatment, which is designed to impart to it the desired color or tint and a high degree of insolubility and hardness throughout its mass. This step involves the use of the two-part composition which forms the subject-matter of invention in the present application. The parts of this composition are formed of the following elements: First part: water, by weight, two hundred parts; sulphate of iron, by weight, six parts. Second part: water, by weight, two hundred parts; alum, by weight, four to five parts; oxalic acid, by weight, two to two and a half parts; bichromate of potash, by weight, two parts. The ingredients of each of these part compositions, being mixed in about the proportions named, form solutions which are used as separate baths; and to this end they are placed in separate vessels of proper shape to receive the article to be treated, which is dipped or immersed first in one and then in the other any desired number of times, and then is permitted to remain in the bath containing the sulphate of iron until the article has acquired the desired degree of hardness and color. The length of time required to effect this result will depend somewhat upon the strength of the ingredients composing the baths or solutions, the porosity and nature or physical and chemical condition of the article under treatment; but usually twelve hours (more or less) will suffice. In the alternate treating of the article in the separate baths above described I prefer repeated dippings—two, three, or more—say two or three seconds at first, and increasing gradually to one, two, three, or more minutes, more or less, with drying intervals of like increasing length between dippings, for half or three-quarters of an hour or so, after which the article may remain in the bath containing the sulphate of iron eleven or twelve hours, more or less.

While I do not limit my invention by any particular theory of chemical or physical reactions involved in the use of these baths as above described, I believe, with my present knowledge, that the metallic salts held in solution in each bath, by taking the place of the molecules of water displaced in the previous dehydrating operation, act chemically or physically upon the calcic sulphate and render it more compact, harder, and less soluble, and that the oxalic acid acts in like manner upon the impurities or matters of other composition, (carbonates, &c.,) which are usually contained in greater or less quantities in native gypsums, and produce like indurating effect upon them, though the salts may have an indurating action upon the impurities present, and the acids may act in like manner more or less upon the calcic sulphate.

By the alternate application of the sulphate of iron and bichromate of potash in the two baths as above described a beautiful yellow color is imparted to the calcic sulphate throughout its mass, which will usually be variegated more or less, however, by irregular lines, veins, or markings of darker shades, and perhaps of other tints, due probably to impurities present in the calcic sulphate. The article (certaldite) thus secured is a valuable material for various uses in the arts, both on account of its beautiful and highly-ornamental appearance and also on account of its high degree of hardness, insolubility, and susceptibility of taking a fine polish.

When the article has been treated in the bath as above described it is removed and dried by exposure to the sun, or to an equivalent furnace-heat, for one or two hours, or by ordinary atmospheric exposure for two or three days, when it is ready for polishing and such other manipulation as may best fit it for its intended use, which may be done by any of the methods practiced in kindred arts.

No claim is made herein to the process set forth, as that, with various modifications of the same, as circumstances may require, forms the subject-matter of the first application herein referred to. Neither do I limit my present invention to the particular way herein described of applying it, though I now believe this way or process to be the best. I also believe the proportions of ingredients which I have named in forming my improved composition to be the best for the purposes stated, and, among others, to secure a uniform degree of hardness and color throughout the mass of the article. If the solutions be very strong, there is great danger of rendering the surface of the article hard very quickly, and thereby preventing proper action of the bath upon the interior substance of the article; or if the solutions be very weak too much time is required, and even then a proper degree of hardness, density, and insolubility is not secured; also, by the conjoint action of all the elements of the two baths much better results are secured, especially upon native gypsums, than by solutions formed of a part of the elements. For these reasons I prefer to employ all the elements of the two-part composition in substantially the proportions named; but such limits, though affording the best results, may be varied or exceeded somewhat and still obtain favorable results under skillful manipulation, and all such modifications employing the elements substantially as herein described in about the proportions set forth I consider as coming within my invention and claim.

I claim as my invention—

The two-part composition herein described for treating dehydrated gypsum in separate baths, each part consisting substantially of the following elements: in the first part water and sulphate of iron, and in the second part water, alum, oxalic acid, and bichromate of potash, in about the proportions set forth.

In testimony whereof I have hereunto set my hand.

RAPHAEL JOSIA.

Witnesses:
GUIDO PANTALIONY,
R. H. WHITTLESEY.